March 18, 1924.   1,487,076
F. PILLEY
CAN EMPTYING MACHINE
Filed April 2, 1921   3 Sheets-Sheet 1
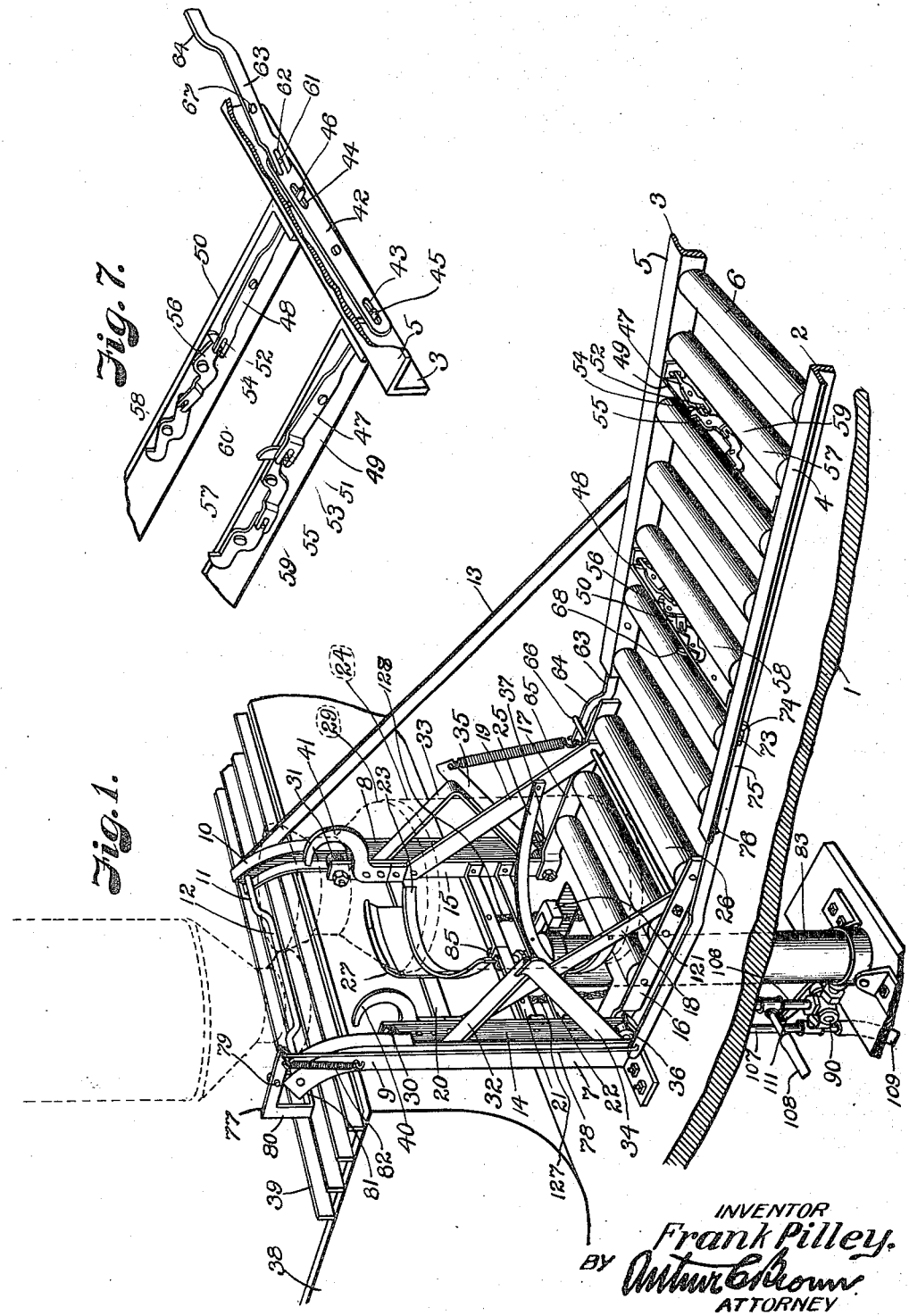
INVENTOR
Frank Pilley.
BY Arthur C. Brown
ATTORNEY

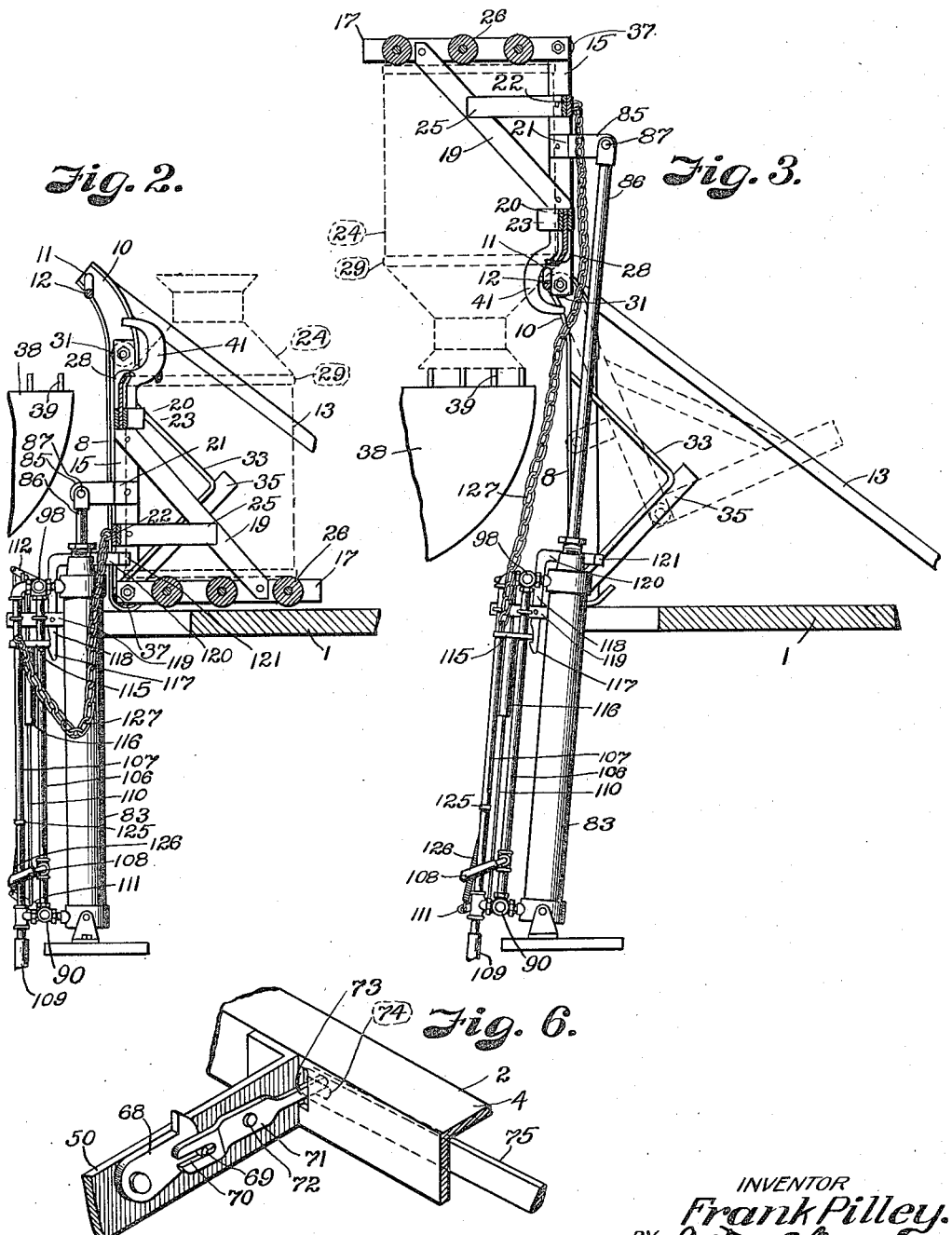

March 18, 1924.

F. PILLEY

CAN EMPTYING MACHINE

Filed April 2, 1921   3 Sheets-Sheet 3

1,487,076

INVENTOR
Frank Pilley.
BY
ATTORNEY

Patented Mar. 18, 1924.

1,487,076

UNITED STATES PATENT OFFICE.

FRANK PILLEY, OF KANSAS CITY, MISSOURI.

CAN-EMPTYING MACHINE.

Application filed April 2, 1921. Serial No. 457,859.

*To all whom it may concern:*

Be it known that I, FRANK PILLEY, a citizen of the United States, residing at Kansas City, in the county of Jackson and State of Missouri, have invented certain new and useful Improvements in Can-Emptying Machines; and I do declare the following to be a full, clear, and exact description of the invention, such as will enable others skilled in the art to which it appertains to make and use the same, reference being had to the accompanying drawings, and to the numerals and figures of reference marked thereon, which form a part of this specification.

This invention relates to can emptying machines and the invention is particularly applicable for use in emptying cans containing cream, milk and the like into a mixing vat or other receptacle.

It is customary in dairies and the like to receive milk and cream from different shipping points and as the milk and cream are delivered from different shipping points, they are obviously of different qualities. It becomes necessary in order to have a uniform grade of milk or cream for distribution that all of the milk or cream be mixed together. This is usually accomplished by delivering the milk or cream into a mixing vat in order to establish a uniform grade for all of the milk or cream delivered.

My invention contemplates means for automatically delivering the cans to the mixing vat, dumping the same and then permitting the empty cans to pass away from the mixing vat, usually to a can cleaning machine.

According to my invention the cans containing the milk or cream can be placed upon an inclined chute or conveyor where they will progressively gravitate to an elevator or carriage, which will be mechanically operated to lift the cans, invert them over the open end of the vat to discharge the contents of the cans, release the cans, and repeat the operation without the aid of personal attention.

The invention involves, aside from the generic embodiment of the invention, certain novel details of construction in the arrangement of parts and combinations of parts, all of which will be apparent from the following description, reference being had to the accompanying drawings, in which—

Fig. 1 is a perspective view of the discharging end of a gravity conveyor or chute and a can dumping mechanism constructed in accordance with my invention.

Fig. 2 is a side elevational view of the can dumping mechanism, showing the dumping carriage in a position to receive a can.

Fig. 3 is a similar view, showing the carriage in can-dumping position.

Fig. 6 is a fragmentary, perspective view of an intermittently operating check or detent for controlling the feed of the cans to the carriage, and Fig. 7 is a fragmentary, perspective view of the intermittently operating checks or feed controlling devices for the cans.

Figure 4:
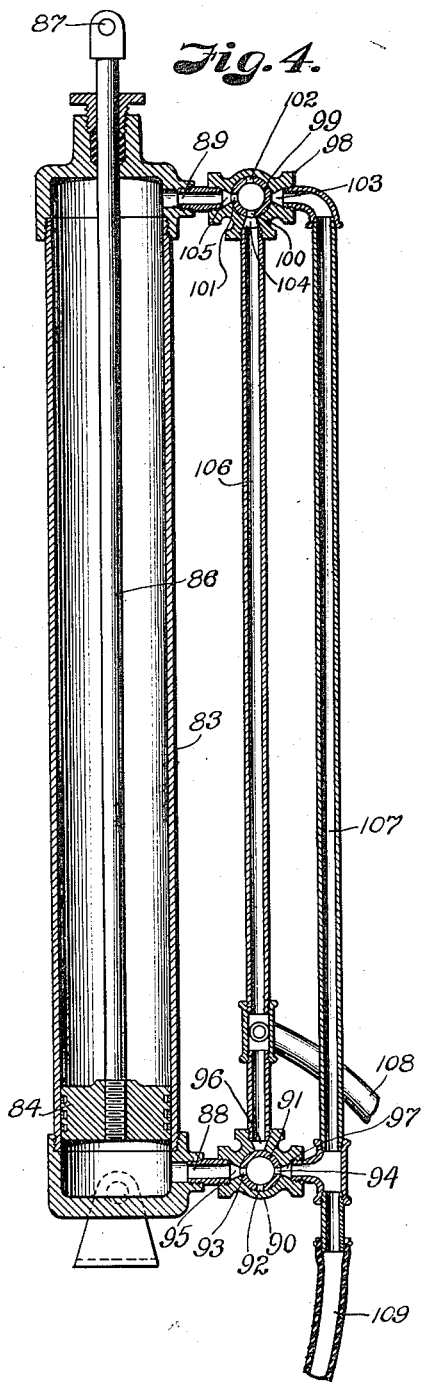
Fig. 4 is a vertical, longitudinal, sectional view through a hydraulic motor and its liquid supply and exhausting apurtenances for operating the carriage.

Referring now to the drawings by numerals of reference:

1 designates a suitable support for example, a floor, shown partly in section in Fig. 1 on which is an inclined gravity conveyor or chute consisting of the angles 2 and 3 having outstanding flanges 4 and 5. The angles 2 and 3 constitute bearings for the rollers 6, over which the cans may pass as they are fed from the receiving end of the gravity conveyor to the delivery end thereof.

Spaced an appropriate distance from the end of the gravity conveyor per se are two standards 7 and 8 in horizontal alignment and provided at their upper ends with laterally curved, channel-shaped guides 9 and 10, the upper extremities of which are connected by a fulcrum rod or rest 11, having an offset portion 12 against which the neck or constricted portion of the can may rest as it is being inverted by the carriage, as will be apparent hereinafter. The lower ends of the standards are curved to provide stops for the carriage to be described hereinafter. One or both of the standards 9 and 10 may be braced by a diagonal brace 13 if desired.

The carriage is adapted to float in the guides when moving to either its dumping position or back to the receiving position because there is no fixed point about which the carriage moves.

The form of carriage illustrated in the drawings consists of a skeleton back wall comprising the uprights or verticals 14 and 15, supporting the floor or horizontal side bars 16 and 17 so that a substantially right angular frame is provided. The transverse or horizontal floor bars 16 and 17 are connected to the verticals by the diagonal braces 18 and 19. The verticals are connected by the horizontal bars 20, 21 and 22, it being obvious that any number of transverse braces may be provided. The bar 20 supports a curved strap 23, which constitutes a seat or saddle against which the upper portion of the can 24 may rest, the circumferential portion of the can 24 also being adapted to be received by the semi-circular strap or saddle 25 carried by the diagonal braces 18 and 19 so that when the can is received upon the rollers 26, journaled in the floor bars 16 and 17 of the dumping frame and contacts with the saddles 23 and 25, it will be held against movement so that it can be swung with the carriage into dumping position, there being a stabilizing, upstanding jaw or plate 27 extending from the bar 20 to fit over the conical neck portion 29 of the can, as will be apparent by reference to Fig. 1.

The carriage is capable of having an upward swinging movement imparted to it by a suitable motor or elevator to be described hereinafter, the movement of the carriage being responsive to certain guiding mechanism which I will now proceed to describe.

In the upper end of the verticals 14 and 15 are rollers 30 and 31, which ride in the channel guides 9 and 10 of the uprights 7 and 8. The uprights 7 and 8 carry triangular guide bars 32 and 33, the angles of which extend in the direction of the receiving end of the floor of the carriage and the lower guide bar members of the guides 32 and 33 are provided with guards 34 and 35 to maintain the lower rollers 36 and 37 on the verticals 14 and 15 in contact with the lower rails of the triangular guides so that when the carriage is raised in the guideways 9 and 10, the rollers 36 and 37 will ride on the bottom rails of the triangular can-tilting guides to swing the bottom or floor of the carriage laterally and upwardly to an inverted position, as shown in Fig. 3, thereby inverting the can so as to discharge its contents into the mixing vat 38. The can at this time is resting upon the horizontal guide rails 39, which constitute a grid over the mixing vat and also serve as skids or runways so that the can may slide from left to right after the contents have been discharged, and be conveyed to a can washing machine if desired. It will be seen that the carriage fulcrums about the axes of the rollers 30 and 31 and that the rollers 36 and 37 will leave the guides 32 and 33 and 34 and 35 when the carriage is inverting, but when it is moving into return position, that is, the position shown in Fig. 1, it will swing back beneath the guides 32 and 33 on account of the positions of the fulcrums or rollers 36 and 37.

The offset portion 12 of the rod 11 constitutes a fulcrum for the neck of the can so that as the carriage moves into dumping position, the can neck will rest upon the offset portion, swinging about it so as to prevent its accidental displacement from the carriage and to facilitate its reversal from normal position to dumping position.

By reference to Fig. 1 it will be observed that the verticals 14 and 15 carry hook-shaped members 40 and 41, which are adapted to swing about the axes of the ends of the rod 11 and when the carriage is in its dumping position, as shown in Fig. 3, the hooks may abut against the end portions of the rod which then constitute stops to stabilize the carriage as the can is discharging its contents into the vat 38.

There is means provided for controlling the feed of the cans to the floor of the carriage and such means is controlled from the carriage. For example, on the vertical web of the angle 3 is a centrally pivoted lever 42, having elongated slots 43 and 44 therein, which are engaged by the ends 45 and 46 of the levers 47 and 48 on the stringers 49 and 50 connected to the angle bars 2 and 3, as clearly indicated in Figs. 1 and 7.

The levers 47 and 48 have bifurcated ends 51 and 52 which engage the pins 53 and 54 on the pivoted dogs 55 and 56, the dogs 55 and 56 being connected to complementary pivoted dogs 57 and 58 by links 59 and 60 (see Fig. 7). One end of the lever 42 is provided with a pin 61, engaged by the bifurcated end 62 of the pivoted lever 63, which has an offset portion 64 connected to the guard 35 by a spring 65. Across the top edge of the offset portion 64 of the lever 63 extends a tripping rod 66, carried by the floor bars 16 and 17 of the carriage.

When the rod 66 bears on the offset portion 64 and the lever 63, the offset portion 64 will be depressed, swinging the bar 63 about its pivot 67, raising the end 46 of the lever 48 and depressing the end 45 of the lever 47. Therefore, the dogs 56 and 58 will be withdrawn below the edge of the stringer 50, allowing a can, previously obstructed by the dogs 56 and 58, to slide onto the floor of the carriage. At the same time the depressed end 45 of the lever 47 will be effective in moving the dogs 55 and 57 above the stringer 49 to obstruct the passage of a can. Then, when the carriage is raised so that the rod 66 will move off 64, the spring 65 will contract enough to reverse the movement of the bar 63 so that the dogs 55 and 57 will be retracted below the top edge of the stringer 49 but the dogs 54 and 58 will project above the top edge of the stringer 50 and this intermittent, alternating operation will be effective in feeding one can to the position ready to move on to the carriage but the can will be held against moving onto the carriage by the dogs 56 and 58 until the carriage has completed its cycle of operation; that is, until it is moved to dumping position and back to can-receiving position.

It may be that under certain conditions the can-receiving carriage will have completed its cycle of operations and be ready to receive the can with the rod 66 resting on the portion 64 and the bar or lever 63 before the can on the grid or rails 39 will have completely discharged its contents. In such an event, the advance of the can onto the carriage will be opposed by a can-controlled detent or dog 68, carried by the stringer 50 on the opposite side from that to which the dogs 56 and 58 are pivoted.

The dog 68 is provided with a pin 69 engaged by the bifurcated end 70 of the lever 71, pivoted at 72 and having an end 73 projecting through the vertical web of the angle 2 to be engaged by the slotted portion 74 of the bar 75, pivoted at 76 and extending to a point adjacent to the upright 7 where it is connected to a lever 77 by a link rod or wire 78. The lever 77 is pivoted to the top of the upright 7 as at 79 and it has a depending arm 80 with a lateral can rest or engaging portion 81. Therefore, when the can is released onto the grid bars 39, its neck flange will rest on the portion 81, depressing the arm 80 and raising the link 78 so that the dog 68 will be projected beyond the upper edge of the stringer 50. Therefore, the can cannot move onto the carriage while another can is resting on the grid and depressing the arm 81. As soon as the can is removed from contact with the portion 81 of the arm 80, the tension spring 82, connected to the lever 77 and to the upright 7, will pull down on the lever 77 so that the link 78 will be moved downwardly, actuating the bar 75 to raise the slotted end 74 thereof, raising the end 73 of lever 71, depressing the bifurcated end 70 thereof and withdrawing the projecting end of the dog 68 below the top edge of the stringer 50. Then the can previously released by the dogs 55 and 57 can pass onto the carriage, ready to be raised again in the cycle of operation.

The elevator for the carriage is a motor, shown as a hydraulic motor consisting of a cylinder 83 and a piston 84. The piston 84 is connected to a bracket 85 on the back frame of the carriage by a piston rod 86 through the medium of a pivot 87. Therefore, when the piston is raised, the carriage will be elevated to swing about the axis of the rollers 30 and 31, at the same time having floating engagement with the guides, that is, so it can rise and swing at the same time until the carriage assumes the position shown in Fig. 3, at which time the can will be inverted, as indicated in the figure, to discharge its contents.

Figure 5:
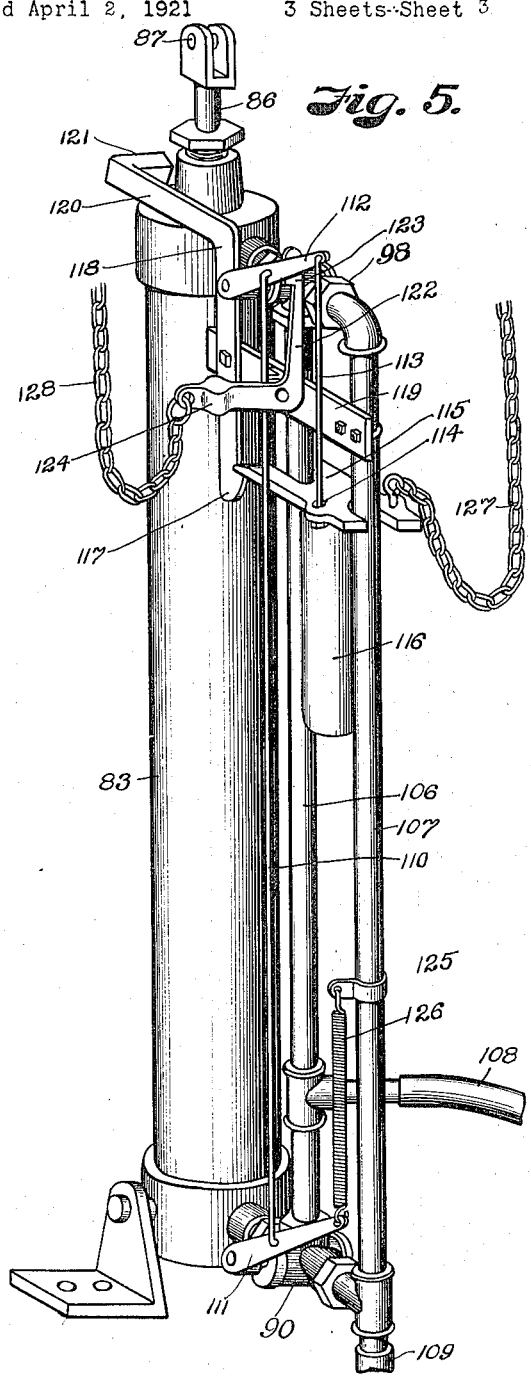
Fig. 5 is a perspective view of the motor and the operating appurtenances.

The means for controlling the motor is an important feature of my invention since its operation is entirely automatic to raise and lower the carriage, the raising and lowering means being governed by the can received on the carriage. The specific form of motor illustrated is best shown in Figs. 4 and 5 as consisting, besides the piston 84 and cylinder 83, of certain controlling mechanism. The cylinder 83 has ports 88 and 89 at its opposite ends with the piston between them, the ports 88 and 89 being adapted to become alternately inlet and outlet ports. The port 88 is provided with a three-way valve casing 90, in which is a three-way valve 91, having ports 92, 93 and 94, there being openings in the valve casing designated 95, 96 and 97. The port 89 also communicates with a three-way valve casing 98, in which is a three-way valve 99, having ports 100, 101 and 102 to align with complementary ports 103, 104 and 105 in the valve casing 98. The ports 96 and 104 are connected by a vertical pipe 106. The ports 97 and 103 are connected by a vertical pipe 107. The pipe 106 is a liquid supply pipe in communication with a suitable source of supply through a tubular connection 108 so that the cylinder 83 may be supplied with liquid to induce movement of the piston 84 in either direction, as will be explained hereinafter.

The pipe 107 is connected to a drain 109 so that it can receive the exhausted fluid from either end of the cylinder 83, dependent upon the direction of travel of the piston 84, as will also be apparent hereinafter.

The valves 91 and 99 are synchronously moved through the medium of a link connection 110, connecting the valve-actuating lever arms 111 and 112 in the ends of the valves 91 and 99 so that when one valve is turned so that communication may be had from the supply pipe 106 to the cylinder 84 on one side of the piston, the cylinder on the opposite side of the piston is in communication with the exhaust or drain pipe 107, and vice versa, as will be clearly apparent by reference to Fig. 4.

The movement of the valves are under the control of the can and the carriage. The lever arm 112 has a anchoring weight support 113 on its free end, which loosely projects through an opening 114 in the head 115 of the weight 116, the weight being normally suspended against movement by the detent hook 117 of the pivoted lever 118, carried by the bracket bar 119, supported by the pipes 106 and 107. The detent lever 118 has a transversely disposed arm 120, with a right angular, can-engaging projection 121, which is positioned to extend slightly in advance of the back end of the carriage, as will be clearly seen by reference to Fig. 1.

The bracket arm 119 supports a pivoted elbow-shaped latch 122, which has a detent hook 123 adapted to move over the upper edge of the arm 112 when the arm has moved low enough and it will normally be held in engagement by the weighted end 124 of the latch 122. The arm 111 is connected to a bracket 125 by a tension spring 126. Therefore, when the parts are in proper position and the can moves onto the carriage, its periphery will strike against the arm 121, moving the detent latch 117 out of engagement with the head 115 and since the weight 116 preponderates over the tension of the spring 126, it will be apparent that the weight will drop, imparting a downward movement to the arm 112 of the valve 99 and a similar movement to the arm 111 for the valve 91, the synchronizing movements responding to the connection 110 between the two levers. Such movement will result in the lower end of the cylinder below the piston 84 being in communication with the pipe 106 and the upper end of the cylinder on the top side of the piston 84 being in communication with the pipe 107. Therefore, liquid will enter the lower portion of the cylinder to raise the piston 84 and it, in turn, will swing the carriage to the position shown in Fig. 3.

During the upward movement of the carriage, the weight will be restored to the position shown in Fig. 5, by the flexible connection, shown as a chain 127, which has one end connected to the head 115 and the other to the bar 21 of the carriage so that when the chain 127 becomes taut, the upward pull induced by the carriage will raise the weight to the position shown in Fig. 5, and since the can is in raised position, as shown in Fig. 3 and out of contact with the arm 121, it will be apparent that the detent 117 will engage under the head 115 to hold the weight in its raised position. At the final upward movement of the carriage, the flexible connection or chain 128, having one end secured to the carriage, will pull upwardly on the weighted end 124 of the elbow-shaped detent arm 122 so as to release the detent 123 from engagement with the lever 112, then the tension of the spring 126 can preponderate and it will be sufficient to reverse the operation; that is, it will pull up on the lever 111 and through the link 110, impart an upward movement to the lever 112, then the valve 99 will effect communication between the pipe 106 and the upper end of the cylinder 83 on top of the piston 84 and consequently, effect discharging communication between the lower end of the cylinder 83 and the drain pipe 107 so that the hydraulic pressure will be from the top of the piston to move the piston downwardly and swing the carriage back to can-receiving position, for example, as shown in Figs. 1 and 2.

When the carriage has gone back to its position, as shown in Figs. 1 and 2, obviously the rod 66, bearing down on 64, will retract the dogs 56 and 58 to allow the can held thereby to slide onto the floor of the carriage. However, if the can which has just been inverted on the grids 39 is not out of its dumping position, that is, if it has not moved away from the position in which it was dumped, it will still be bearing on the arm 81 and through its connections with the dog or detent 68, will have the toe of the detent 68 raised above the stringer 50. Therefore, the can cannot move onto the carriage until the previously dumped can has moved off the grid or has been taken away therefrom. Just as soon as it has, however, the can moving onto the floor of the carriage will come in contact with the lateral arm 121 and set the motor in operation again so that the carriage will swing outwardly and upwardly, tilting the can in inverted position to dump the contents into the vat. This cycle of operation will continue so long as there are cans to be fed and so long as the dumped cans successively move away from the grid bars 39.

In view of the foregoing it will be apparent that the can handling machine is entirely automatic in its operation, that it needs no personal attention and that it will mechanically feed the cans onto the carriage, raise and dump them and receive additional cans so long as cans are supplied and so long as there is a supply of liquid to feed the hydraulic motor.

What I claim and desire to secure by Letters-Patent is:

1. In a device of the class described, a receptacle-receiving carriage, means for feeding receptacles to said carriage, means for imparting a swinging motion to the carriage to invert the receptacles to dumping poistion, and means for causing a vertical movement of the carriage in addition to its swinging movement.

2. In a device of the class described, a receptacle-receiving carriage, means for imparting a swinging motion to the carriage to invert it, and an elevating and lowering means for the carriage to cause the point about which the carriage swings to raise during the upwardly swinging movement of the carriage and to lower during the downward swinging movement of the carriage.

3. In a device of the class described, a receptacle-receiving carriage, means for imparting a swinging motion to the carriage to invert it and an elevating means for the carriage, to cause the point about which the carriage swings to raise during the swinging movement of the carriage.

4. In a device of the class described, a can-dumping carriage having a floor onto which the can is to be received, a carriage-inverting means, and a motor for raising and lowering the carriage in a vertical plane during its swinging motion to inverting or normal position, the motor being controlled by the position of the can on the carriage.

5. In a device of the class described, an inclined runway for milk cans, a carriage at the bottom of said runway, intermittently operating can detents in the runway, means on the carriage for controlling said detents, and means for imparting an upward and laterally swinging movement to the carriage to invert the milk cans into dumping position.

6. In a device of the class described, a milk can runway, a can-receiving carriage at one end of the runway, means for imparting a vertical movement to the carriage, and means for swinging the bottom of the carriage laterally and upwardly to inverted position.

7. In a device of the class described, a milk can runway, a can carriage, a can carriage guide, a can carriage tilting means adjacent to the guide, and a motor for actuating the carriage.

8. In a device of the class described, a milk can runway, a can carriage, a can carriage guide, a can carriage tilting means adjacent to the guide, a motor for actuating the carriage, and can-actuated means for controlling the motor.

9. In a device of the class described, a milk can delivering means, a carriage at one end of the delivering means provided with vertical members, guides for the upper ends of the vertical members, upwardly and outwardly inclined guides for the lower ends of the vertical members whereby the upward movement of the carriage will cause the lower end thereof to swing about the guided upper portions of the vertical members, and a motor for said carriage.

10. In a device of the class described, a milk can delivering means, a carriage at one end of the delivering means provided with vertical members, guides for the upper ends of the vertical members, upwardly and outwardly inclined guides for the lower ends of the vertical members whereby the upward movement of the carriage will cause the lower end thereof to swing about the guided upper portions of the vertical members, a motor for said carriage, and means for controlling said motor comprising a valve-actuating abutment against which the can will contact upon entering the carriage.

11. In a device of the class described, a milk can delivering means, a carriage at one end of the delivering means provided with vertical members, guides for the upper ends of the vertical members, upwardly disposed guides for the lower ends of the vertical members whereby the upward movement of the carriage will cause the lower end thereof to swing about the guided upper portions of the vertical members, a motor for said carriage, means for controlling said motor comprising a valve-actuating abutment against which the can will contact upon entering the carriage, a can detent on the milk can delivering means, and means for rendering the can detent effective in response to the weight of an inverted can in contact therewith.

12. In a device of the class described, a runway for milk cans, a carriage at the end of the runway, intermittently operating can detents spaced apart and in the path of the runway, means for actuating the detents in response to the weight of the carriage, means for elevating said carriage to move it into dumping position, and means for restoring said carriage to normal position.

13. In a device of the class described, an inclined runway for cans, a pair of vertical guides in the end of the runway, a carriage provided with a frame slidable in the guides and having pivots at its upper ends, outwardly inclined guides adjacent to the first-named guides, rollers on the carriage movable over said outwardly inclined guides so that when the carriage is raised, the lower portion of the carriage will ride on the outwardly inclined guides to swing the lower portion away from the guides, and an elevating mechanism for raising the carriage so that as the rollers ride on the outwardly inclined guides, it will swing into inverted position.

14. In a device of the class described, an inclined can runway, a carriage having an upwardly swinging, inverting movement, an elevating means for actuating said carriage, a detent in the path of the runway, a controller actuated by the inverted can, and another detent in the path of the runway actuated by the weight of the carriage.

15. In a device of the class described, a runway, a dumping carriage at the end of the runway, a motor for operating said carriage, a controller actuated in response to the pressure of a can on the carriage for starting the motor to raise the carriage to inverted position, and means connected to the carriage for reversing the operation of the motor after the motor has reached the limit of its inverted position.

16. In a device of the class described, a milk can runway, a can carriage, a can-carriage guide, means on the carriage engaging the guide, means for imparting a vertical movement to the can carriage, and a can-carriage tilting means adjacent to the guide.

17. In a device of the class described, a receptacle-receiving carriage, a carriage guide, means on the carriage engaging the guide whereby the carriage can be guided in a vertical path, and a receptacle-carriage tilting means adjacent to the guide.

In testimony whereof I affix my signature.

FRANK PILLEY.